United States Patent
Proia

(10) Patent No.: US 6,431,564 B1
(45) Date of Patent: Aug. 13, 2002

(54) ADD-ON SELF TRACKING AXLE FOR A VEHICLE

(76) Inventor: Cataldo Proia, 127 W. Embargo St., Rome, NY (US) 13440

( * ) Notice: Subject to any disclaimer, the term of this patent is extended or adjusted under 35 U.S.C. 154(b) by 0 days.

(21) Appl. No.: 09/663,031

(22) Filed: Sep. 15, 2000

Related U.S. Application Data

(63) Continuation of application No. 09/139,118, filed on Aug. 24, 1998.

(51) Int. Cl.[7] .............................. B60G 1/00; B60P 1/00
(52) U.S. Cl. ............... 280/86.5; 280/405.1; 280/423.1; 280/426; 280/442; 280/443; 280/445; 280/476.1
(58) Field of Search .............................. 280/426.1, 442, 280/443, 405.1, 407.1, 445, 423.1, 426, 86.5

(56) References Cited

U.S. PATENT DOCUMENTS

| | | | | |
|---|---|---|---|---|
| 3,580,347 A | * | 5/1971 | Donald | 280/680 |
| 3,586,308 A | * | 6/1971 | John | 280/680 X |
| 3,591,197 A | * | 7/1971 | Richard | 280/680 |
| 3,738,631 A | * | 6/1973 | Haley | 280/682 X |
| 3,841,652 A | * | 10/1974 | Higginson | 280/682 X |
| 3,913,937 A | * | 10/1975 | Longworth et al. | 280/682 X |
| 3,929,347 A | * | 12/1975 | Masser | 280/682 X |
| 3,933,367 A | * | 1/1976 | Tamas | 280/682 X |
| 4,033,606 A | * | 7/1977 | Ward et al. | 280/682 X |
| 4,085,948 A | * | 4/1978 | Turner | 280/682 |
| 4,342,469 A | * | 8/1982 | Corner et al. | 280/808 X |
| 4,383,703 A | * | 5/1983 | Honda | 280/682 |
| 5,209,518 A | * | 5/1993 | Heckenliable et al. | 280/680 |
| 5,320,376 A | * | 6/1994 | Bojarski et al. | 280/808 |
| 5,526,895 A | * | 6/1996 | Shin | |
| 5,540,454 A | * | 7/1996 | VanDenberg et al. | 280/808 |
| 5,924,716 A | * | 7/1999 | Burkhart, Sr. et al. | 280/808 X |
| 6,007,078 A | * | 12/1999 | Gottschalk et al. | 280/808 |

FOREIGN PATENT DOCUMENTS

| | | | | |
|---|---|---|---|---|
| FR | 1446000 | * | 6/1966 | 280/808 |
| SU | 1562208 | * | 5/1990 | 280/808 |

* cited by examiner

*Primary Examiner*—Lanna Mai
*Assistant Examiner*—Toan C To
(74) *Attorney, Agent, or Firm*—George R. McGuire; Hancock & Estabrook, LLP

(57) ABSTRACT

The present invention is a self steering "add on" axle system for use with a vehicle such a dump truck in order to increase the legal weight capacity of the vehicle and provide effective steering in both the forward and reverse directions. The system comprises a standard axle with king pin within a sleeve that is suspended by a leaf spring. The leaf spring is rotatably connected to a first leaf spring hangers and interconnected to second leaf spring hangers by a load adjustment members. The axle and king pin are tilted approximately eight degrees positively or negatively from vertical by a control system to further promote self steering when the vehicle is moving in either the forward or reverse direction.

6 Claims, 5 Drawing Sheets

PRIOR ART

ADD-ON SELF TRACKING AXLE FOR A VEHICLE

This Application is a continuation of application Ser. No. 09/139,118, Filed on Aug. 24, 1998

FIELD OF THE INVENTION

The present invention relates "add on" axle systems used by commercial vehicles to increase the legal weight capacity of the vehicle.

BACKGROUND OF THE INVENTION

Commercial vehicles such as dump trucks often have an "add on" axle to increase the legal weight capacity of the vehicle. FIG. 1 depicts a vehicle 200 having an "add on" axle 202 mounted to a frame 204 of the vehicle. A tire 204 is shown mounted to the axle 202. Such conventional "add on" axle systems are not without their several drawbacks. For example, conventional "add on" axles do not self-track as sharply as necessary and the driver of the truck must typically raise the "add on" axle in order to negotiate a turn and thereafter lowers the "add on" axle to continue forward travel. Steering with such "add on" axle systems may be so difficult that some drivers may only lower the "add on" axle when passing an inspection station or a law enforcement officer, thereby causing a dangerous situation to the public because the load being carried by the vehicle is not adequately supported.

SUMMARY OF THE INVENTION

The primary object of the present invention to provide an "add on" axle steering system to increase the legal weight capacity of the vehicle without the need for the driver to raise the "add on" on axle due to lack of steering capability in both the forward and reverse direction.

The present invention is a self steering "add on" axle system for use with a vehicle such as dump truck to increase the legal weight capacity of the vehicle and to provide effective steering in both the forward and revers direction. In one embodiment, the system comprises first and second hangers securely mounted to the frame of the vehicle. The system further comprises a leaf spring having first and second end portions and a bearing portion. The first end portion of the leaf spring is rotatably connected to the first hanger. The system further comprises a load adjustment member having a first end rotatably connected to the second hanger and a second end rotatably connected to the second end portion of the leaf spring. The system further comprises a stationary sleeve member securely engaged to the bearing portion of the leaf spring by a plurality of u-bolts. The system further comprises an axle rotatably disposed within the sleeve member. The system further comprises a leverage arm securely connected to the axle. The system further comprises a control system engaged with the leverage arm and operable between a first position where the king pin and the axle are positively tilted to eight degrees to provide self steering of the axle when the vehicle is moving forward to a second position wherein the king pin and the axle are negatively tilted to eight degrees to provide self steering of the axle when the vehicle is moving in the reverse direction.

BRIEF DESCRIPTION OF THE DRAWINGS

The following detailed description of the invention will be more fully understood with reference to the accompanying drawings in which.

DETAILED DESCRIPTION OF THE INVENTION

Figure 1:
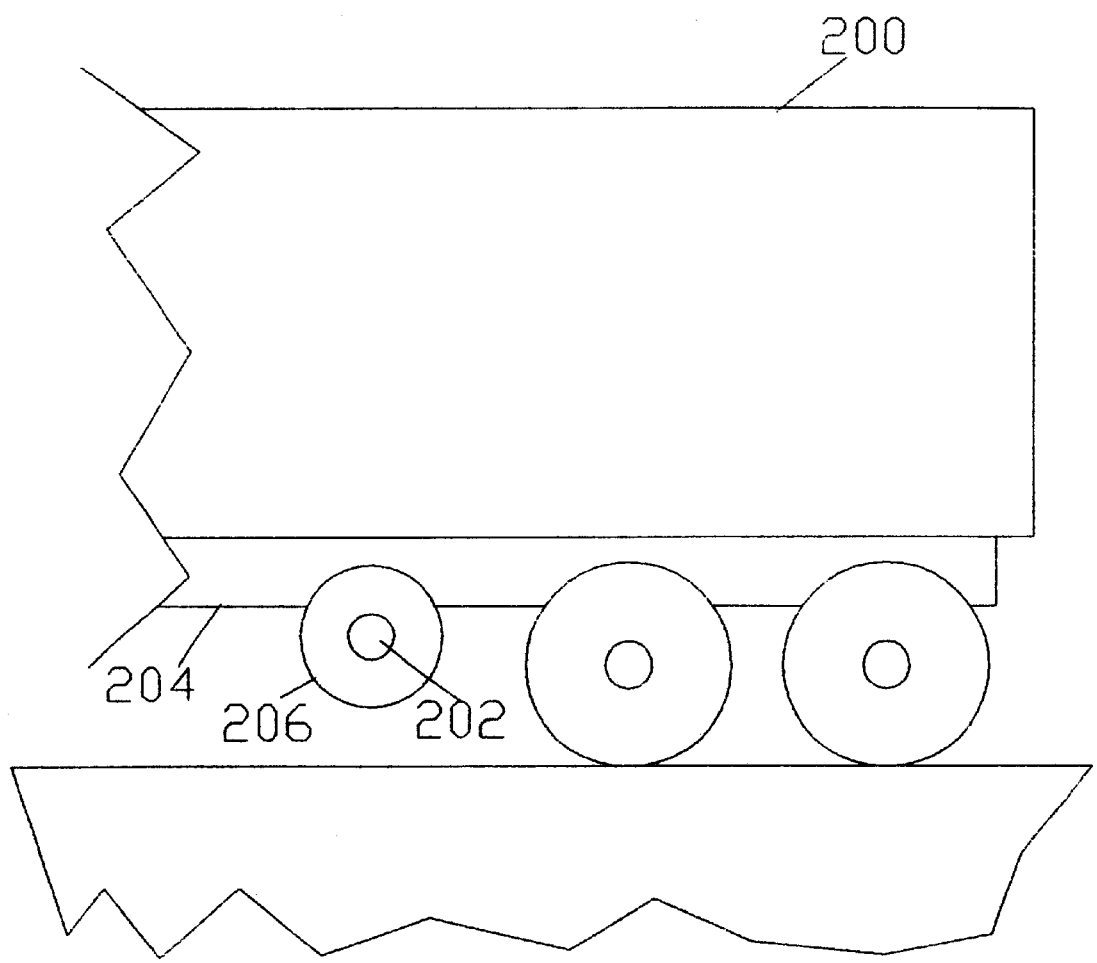
FIG. 1 is a side elevation view of a prior art vehicle having an "add on" axle.
Figure 2:
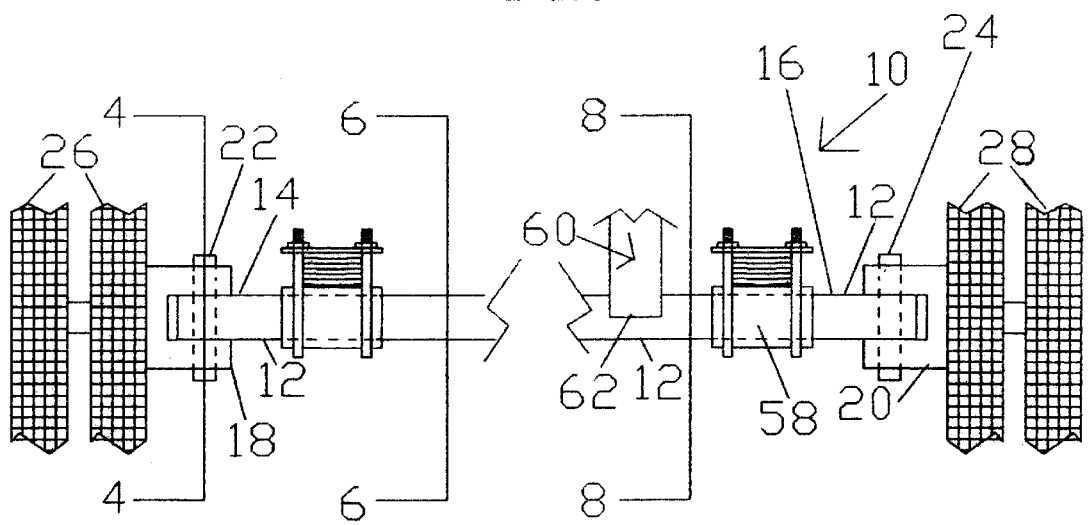
FIG. 2 is a front elevation view of a first embodiment of the present invention showing the axle and king pin tilted positive eight degrees for forward movement.
Figure 3:
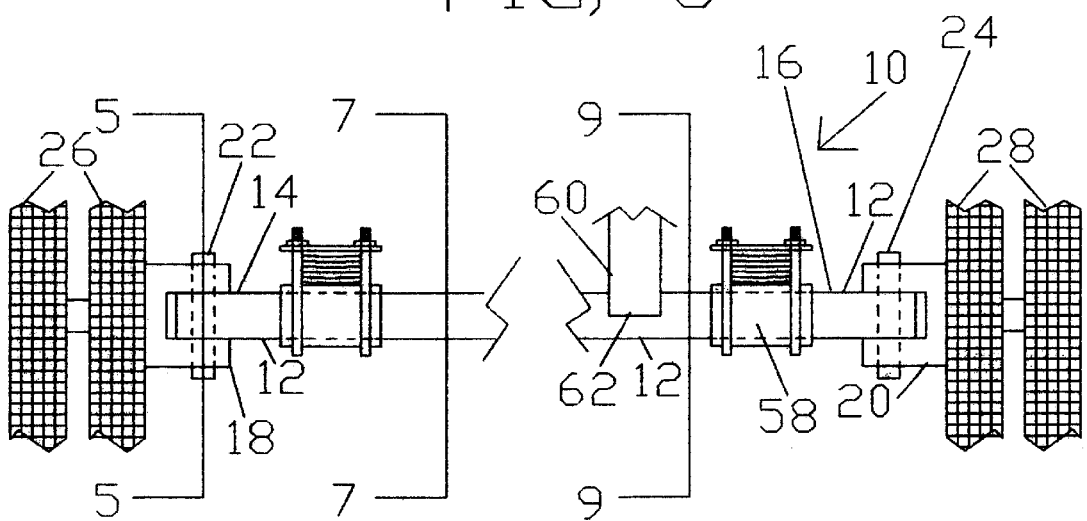
FIG. 3 is a front elevation view of a first embodiment of the present invention showing the axle and king pin tilted positive eight degrees for forward movement.
Figure 4:
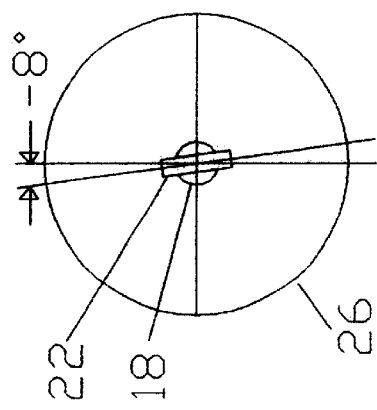
FIG. 4 is a cross-section view taken along line 4—4 of FIG. 2 showing the king pin tilted positive eight degrees for forward movement.
Figure 5:
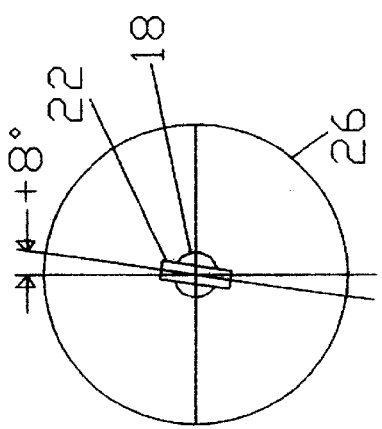
FIG. 5 is a cross-section view taken along line 5—5 of FIG. 3 showing the king pin tilted negative eight degrees for forward movement.
Figure 6:
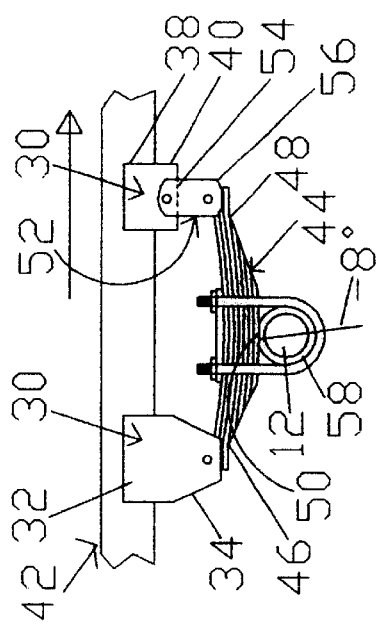
FIG. 6 is a cross section view taken along line 6—6 of FIG. 2 showing the axle tilted positive eight degrees for forward movement and disposed with a stationary sleeve.
Figure 7:
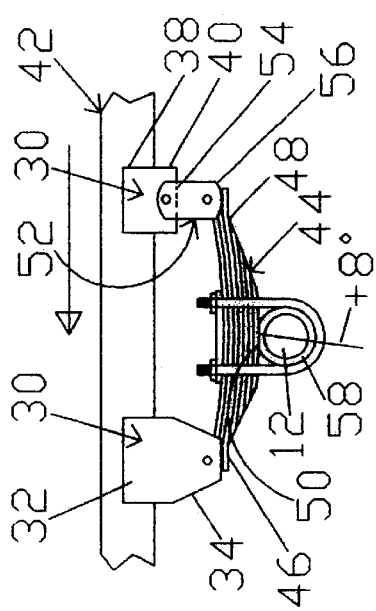
FIG. 7 is a cross section view taken along line 7—7 of FIG. 3 showing the axle tilted negative eight degrees for rearward movement and disposed with a stationary sleeve.

Referring now to FIGS. 2–7, wherein the present invention is an "add on" self steering axle system 10 generally comprising an axle 12 having first and second ends 14 and 16 secured connected to hubs 18 and 20 by king pins 22 and 24, respectively. Wheels 26 and 28 are mounted to hubs 18 and 20 by conventional means such as bolts (not shown). The system 10 further comprises a first hanger 30 having a first end portion 32 and a second end portion 34. The system 10 further comprises a second hanger 36 having a first end portion 38 and a second end portion 40. The first end portion 32 of the hanger 30 is securely mounted to a frame 42 of a vehicle (not shown). Similarly, the first end portion 38 of the second hanger 36 is securely connected to the frame 42. The system 10 further comprises a leaf spring 44 having a first end portion 46, a second end portion 48, and a median or bearing portion 50. The first end portion 46 of the leaf spring 44 is rotatably engaged with the second end portion 34 of the first hanger 30 by conventional fastening means such as a pin. The system 10 further comprises a load adjustment member 52 having a first end portion 54 and a second end portion 56. The first end portion 54 of the load adjustment member 52 is rotatably connected to the second end portion 40 of the second hanger 32 by conventional means such as a pin. The second end portion 48 of the leaf spring 44 is rotatably engaged with the second end portion 56 of the load adjustment member 52 by conventional means such as a pin. The system 10 further comprises a cylindrical shaped stationary sleeve member 58 disposed coaxially about a portion of the axle 12 and is securely and rigidly engaged to the bearing portion 50 of the leaf spring 44. The axle 12 is rotatably disposed within the sleeve member 58. The system 10 further comprises a leverage arm 60 having a first end portion 62 and a second end portion 64 (to be described). The first end portion 62 of the leverage arm 60 is securely and rigidly connected to the axle 12 by conventional means such as welding. The axle 12 and the hubs 18 and 20 extend coaxially about the same centerline making is significantly easier to rotate the king pins 22 and 24 and axle 12 to either the negative of positive tilted position.

Figure 8:
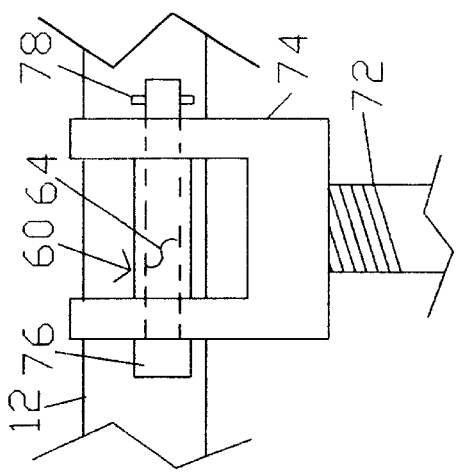
FIG. 8 is a cross section view taken along line 8—8 of FIG. 2 showing a pneumatic cylinder having a rod connected to a sleeve member to move the axle positive eight degrees for forward movement.
Figure 9:
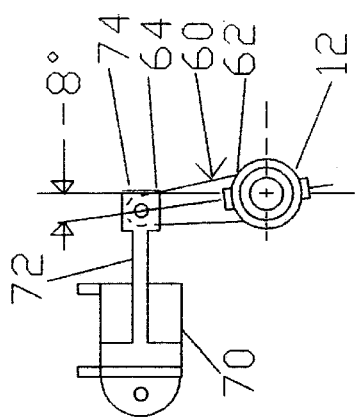
FIG. 9 is a cross section view taken along line 9—9 of FIG. 3 showing a pneumatic cylinder having a rod connected to a sleeve member to move the axle negative eight degrees for rearward movement.
Figure 10:
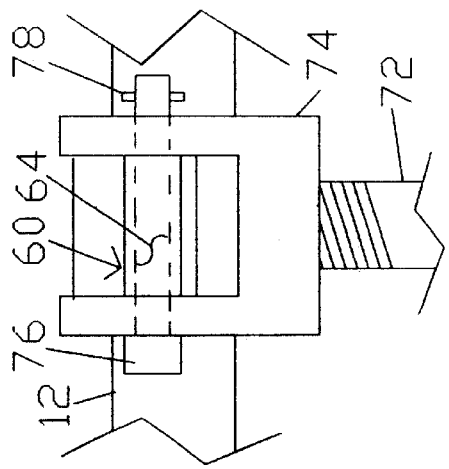
FIG. 10 is a top plan view of the lever and rod connection when the axle is positively tilted eight degrees for forward movement.
Figure 11:
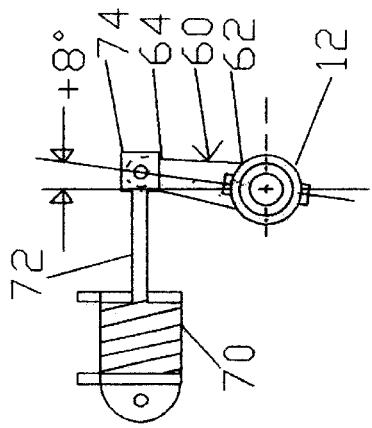
FIG. 11 is a top plan view of the lever and rod connection when the axle is positively tilted eight degrees for forward movement.
Figure 12:
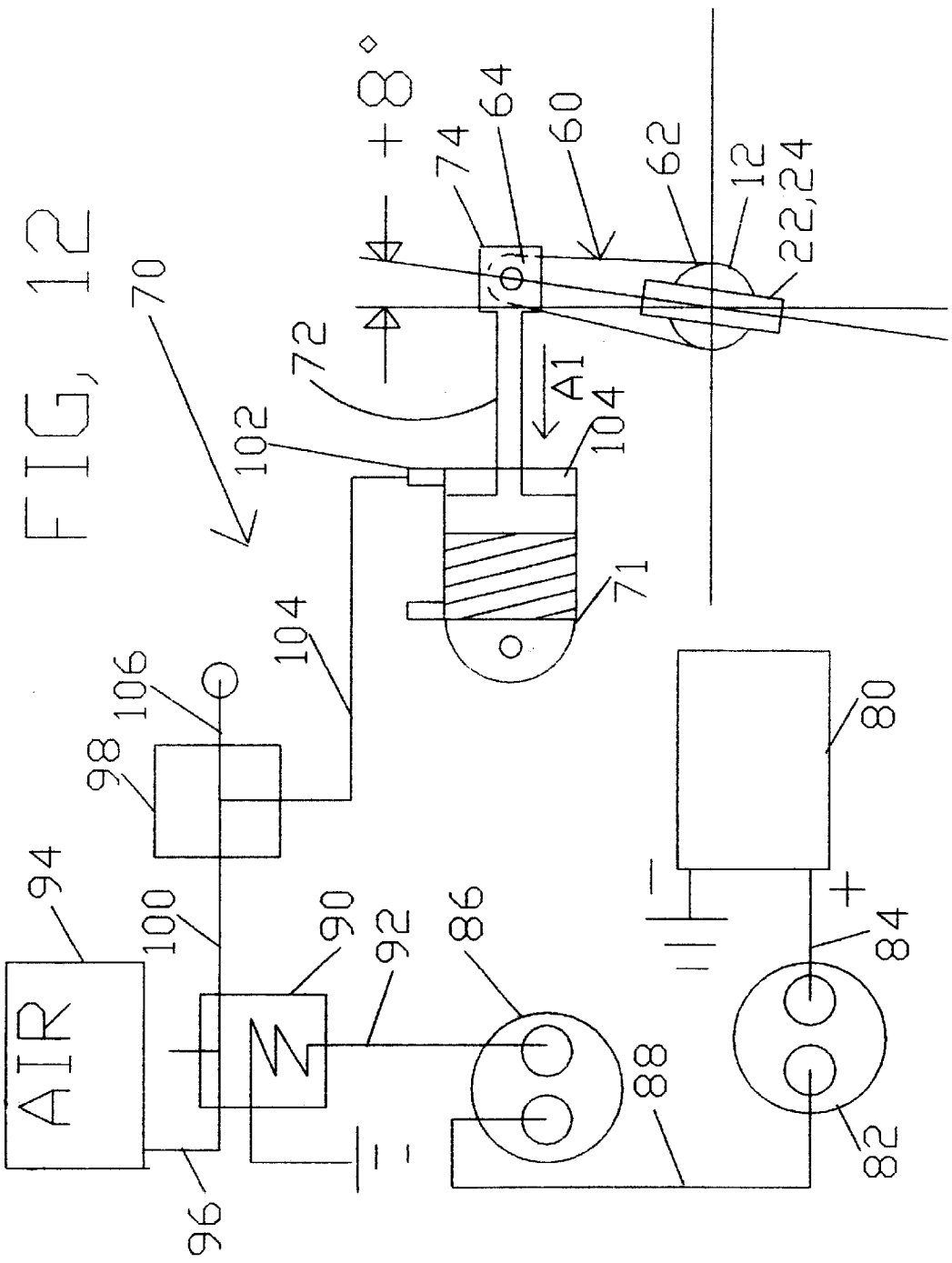
FIG. 12 is a high level block diagram showing a control system for providing movement of the king pin and axle to both positive and negative eight degrees.

Referring to FIGS. 8–12, the system 10 further comprises a control system 70 which is generally provided to move the leverage arm 60 between a first position where the king pins 22 and 24 and the axle 12 are rotated to a tilted position of positive eight degrees to provide self steering of the axle 12 when the vehicle is moving forward to a second position where the king pins 22 and 24 and the axle 12 are rotated to a tilted position of negative eight degrees to provide self steering of the axle 12 when the vehicle is moving in the reverse direction. The control system 70 generally comprises an air cylinder 71 having a rod 72 and an arm or clevis 74 securely and rigidly engaged thereto by a threaded end and hole which also allows initial manual adjustment. The arm 74 is securely connected to the second end portion 64 of the lever member 60 by conventional means such as a pin 76 and cotter key 78.

When the vehicle is running, power is supplied from a battery 80 to an ignition switch 82 along a path 84. The ignition switch 82 is connected to a reverse operated switch 86 located on the transmission (not shown) of the vehicle along a path 88. When the transmission is shifted into reverse, the switch 86 will apply power to (or energize) a normally closed valve or solenoid 90 along a path 92. When the solenoid 90 is energized, air from an air tank 94 is allowed to flow through the valve 90 along a path 96 to an air relay valve 98 along a path 100 applying air pressure to an air inlet 102 of the air cylinder 71 along a path 104. Air flow into the air inlet 102 causes air to enter a chamber 104 of the air cylinder 71 pulling shaft 72 and arm 74 to rotate axle 12 and king pins 22 and 24 to an angle of negative eight degrees for reverse self steering of the axle 12. When the transmission is moved to the forward position, the switch 86 opens and power is removed from the solenoid 90 closing air supply to the air relay valve 98 and air contained in the chamber 104 of the air cylinder 71 is automatically dumped along path 104 and 106, thereby causing the shaft 72 and arm 74 to be move forwarded thereby rotating the axle 12 and king pins 22 and 24 to the normal positive eight degree angle for forward self tracking movement.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A self steering axle system for use with a vehicle having a frame to assist the vehicle in moving in the forward and reverse direction, the system comprising:
   (a) first and second hangers securely mounted to the frame;
   (b) a leaf spring having first and second end portions and a bearing portion, said first end portion of said leaf spring being rotatably connected to said first hanger;
   (c) a load adjustment member having a first end rotatably connected to said second hanger and a second end rotatably connected to said second end portion of said leaf spring;
   (d) a sleeve member securely engaged to said bearing portion of said leaf spring;
   (e) an axle rotatably disposed within said sleeve member;
   (f) king pin attached to an end of said axle;
   (g) a leverage arm securely connected to said axle; and
   (h) a control system engaged with said leverage arm and operable between a first position where said king pin and said axle are positively tilted to provide self steering of said axle when the vehicle is moving forward to a second position wherein said king pin and said axle are negatively tilted to provide self steering of said axle when the vehicle is moving in the reverse direction.

2. The suspension system of claim 1, wherein said sleeve extends co-axially about a portion of said axle.

3. The suspension system of claim 2, wherein in said first operating position said king pin and said axle are positively tilted eight degrees.

4. The suspension system of claim 3, wherein in said second operating position said king pin and said axle are negatively tilted eight degrees.

5. The system of claim 4, wherein said control system comprises an air cylinder having a rod and an arm connected to said leverage arm.

6. The system of claim 5, wherein said rod of said air cylinder is normally in an extended position such that said axle and said king pin are positively tilted to said eight degrees.

* * * * *